UNITED STATES PATENT OFFICE.

DANIEL W. EDWARDS, OF BELOIT, WISCONSIN.

ALTERATIVE AND TONIC BITTERS.

SPECIFICATION forming part of Letters Patent No. 252,652, dated January 24, 1882.

Application filed November 18, 1881. (Specimens.)

*To all whom it may concern:*

Be it known that I, DANIEL W. EDWARDS, a citizen of the United States, residing at the city of Beloit, in the county of Rock and State of Wisconsin, have invented a new and useful composition of matter or medicinal compound to be used for the treatment and cure of chronic and other complaints or diseases in general, such as all forms of liver complaint and stomach ailments, promoting a healthy action of the stomach, liver, bowels, kidneys, and nervous system, and for curing catarrh and rheumatism, and as a blood-purifier for cleansing the system of all impurities, of which the following is a specification.

My composition of matter or medicinal compound consists of the following ingredients combined in about the proportions stated, viz: fluid extract of hops, one pound; fluid extract of red cinchona, eight ounces; fluid extract of sarsaparilla, six ounces; fluid extract of dandelion, six ounces; fluid extract of burdock, six ounces; fluid extract of yellow dock, six ounces; fluid extract of golden seal, six ounces; fluid extract of mandrake, four ounces; oil of winter-green, three-fourths of an ounce; oil of sassafras, three-eighths of an ounce; oil of lemons, three-eighths of an ounce; oil of horse-mint, one-fourth of an ounce; granulated, loaf, or other fine clarified sugar, six pounds; alcohol, (about ninety-four per cent.,) two gallons, adding pure water sufficient to make in all twelve gallons. These ingredients are to be thoroughly mingled and compounded substantially in about the following manner: Use a suitable metallic or metal-lined vessel having a capacity of twelve gallons and a two-quart graduated or gaged wine-measure. First put into the vessel one gallon of pure water, to which add all the extracts mentioned in the formula and three quarts of the alcohol, and stir well together. Then put thirty ounces of the alcohol into the wine-measure, and add thereto all the oils mentioned in the formula. Stir well till cut. Then pour the contents of the measure into the mixture, and stir well. Then add the sugar, and stir till dissolved. Then add pure water, as per formula, and stir well. Add the remaining gallon of alcohol, and stir while pouring into the mixture. Let it stand about one hour. Remove the scum, and filter through paper or other appropriate material, when the medicine will be ready for bottling and fit for use.

For an adult, from a tea to a table spoonful in a little water, or clear, as preferred, before meals; but if the patient be dyspeptic, then after eating. For a child ten years old, twenty drops to a tea-spoonful. It should not be used as a cathartic, but only sufficient to keep the bowels regular. The dose should be varied to suit each particular case.

I am aware that a composition or medical compound consisting of fluid extract of hops and other ingredients, known as "Hop Bitters," has been used for a medicine; but I am not aware that all the ingredients of my composition or medicinal compound, in the proportions stated, have been used together.

What I claim, and desire to secure by Letters Patent of the United States, is—

The herein-described composition of matter, constituting a new medicinal compound to be used for the purpose of the treatment and cure of the diseases or ailments mentioned in the foregoing specification, and to be administered in doses substantially as hereinbefore specified, consisting of the ingredients stated in the foregoing formula and substantially in the proportions set forth, to wit: fluid extract of hops, one pound; fluid extract of red cinchona, eight ounces; fluid extract of sarsaparilla, six ounces; fluid extract of dandelion, six ounces; fluid extract of burdock, six ounces; fluid extract of yellow dock, six ounces; fluid extract of golden seal, six ounces; fluid extract of mandrake, four ounces; oil of winter-green, three-fourths of an ounce; oil of sassafras, three-eighths of an ounce; oil of lemons, three-eighths of an ounce; oil of horse-mint, one-fourth of an ounce; granulated, loaf, or other fine clarified sugar, six pounds; alcohol, (about ninety-four per cent.,) two gallons, with pure water sufficient to make in all twelve gallons.

DANIEL W. EDWARDS.

Witnesses:
B. A. CHAPMAN,
C. O. TATTERSHALL.